(12) United States Patent
Jing et al.

(10) Patent No.: US 10,871,859 B2
(45) Date of Patent: Dec. 22, 2020

(54) TOUCH CONTROL DEVICE, ELECTRONIC APPARATUS AND CONTROL METHOD OF ELECTRONIC APPARATUS

(71) Applicants: BOE Technology Group Co., Ltd., Beijing (CN); Hefei BOE Optoelectronics Technology Co., Ltd., Hefei (CN)

(72) Inventors: Yangkun Jing, Beijing (CN); Hongguang Guo, Beijing (CN); Jia Ding, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 227 days.

(21) Appl. No.: 16/049,939

(22) Filed: Jul. 31, 2018

(65) Prior Publication Data
US 2019/0042058 A1  Feb. 7, 2019

(30) Foreign Application Priority Data

Aug. 1, 2017 (CN) .......................... 2017 1 0648266

(51) Int. Cl.
*G06F 3/043* (2006.01)
*G06K 9/00* (2006.01)
(Continued)

(52) U.S. Cl.
CPC ............ *G06F 3/0436* (2013.01); *G06F 21/32* (2013.01); *G06K 9/0002* (2013.01);
(Continued)

(58) Field of Classification Search
CPC ..... G06F 3/0436; G06F 21/32; G06K 9/0002; G06K 9/00087
(Continued)

(56) References Cited

U.S. PATENT DOCUMENTS 9,697,721 B1 * 7/2017 Akuoku ............. G08B 13/1436
9,779,282 B1 * 10/2017 Ghavanini ........... G06K 9/0002
(Continued)

FOREIGN PATENT DOCUMENTS

CN       104205029 A    12/2014
CN       204331751 U     5/2015
(Continued)

OTHER PUBLICATIONS

First office action of Chinese application No. 201710648266.0 dated Jul. 30, 2019.

*Primary Examiner* — Fred Tzeng
(74) *Attorney, Agent, or Firm* — Fay Sharpe LLP

(57) ABSTRACT

A touch control device, electronic apparatus and control method thereof. The touch control device includes a processor and a plurality of transceivers disposed in an array. The transceivers is used to transmit ultrasonic waves and receive ultrasonic waves that are reflected back, and directions in which the plurality of transceivers transmits the ultrasonic waves are parallel to one another. The processor is connected to each transceiver and used to determine a touch control signal in accordance with at least one of a time difference between time at which each transceiver transmits the ultrasonic waves and time at which each transceiver receives the ultrasonic waves and an intensity difference between the transmitted and received ultrasonic waves, and to control the touch control device in accordance with the touch control signal, in which the touch control signal comprises at least one of an operation instruction and user fingerprint information.

20 Claims, 2 Drawing Sheets

---

S31: determining at least one of a time difference between times at which each of a plurality of transceivers transmits and receives ultrasonic waves and an intensity difference between the transmitted and received ultrasonic waves S32: determining a touch control signal in accordance with at least one of the time difference between the times at which each of the transceivers transmits and receives the ultrasonic waves and the intensity difference between the transmitted and received ultrasonic waves, wherein the touch control signal comprises at least one of an operation instruction and user fingerprint information S33: controlling the electronic apparatus in accordance with the touch control signal

(51) Int. Cl.
  *G06F 21/32* (2013.01)
  *H04M 1/725* (2006.01)
  *G06F 3/0488* (2013.01)

(52) U.S. Cl.
  CPC ...... *G06K 9/00087* (2013.01); *G06F 3/04883* (2013.01); *H04M 1/72577* (2013.01)

(58) Field of Classification Search
  USPC .......................................................... 345/177
  See application file for complete search history.

(56) References Cited

U.S. PATENT DOCUMENTS

| | | | |
|---|---|---|---|
| 9,898,640 B2* | 2/2018 | Ghavanini | G06F 3/044 |
| 9,911,184 B2* | 3/2018 | Du | G06K 9/00067 |
| 9,953,205 B1* | 4/2018 | Rasmussen | G06K 9/0002 |
| 10,036,734 B2* | 7/2018 | Fennell | G01N 29/22 |
| 10,095,907 B2* | 10/2018 | Hinger | G01S 7/52079 |
| 10,127,425 B2* | 11/2018 | Panchawagh | G06K 9/0002 |
| 10,235,552 B2* | 3/2019 | D'Souza | G06K 9/228 |
| 10,262,188 B2* | 4/2019 | Agassy | G06K 9/00107 |
| 10,275,634 B2* | 4/2019 | Jeong | G06K 9/0002 |
| 10,503,309 B2* | 12/2019 | Hinger | G01N 29/2437 |
| 10,515,255 B2* | 12/2019 | Strohmann | G06K 9/0002 |
| 10,552,658 B2* | 2/2020 | Strohmann | G06K 9/0002 |
| 2004/0021552 A1* | 2/2004 | Koo | G07C 9/257 340/5.53 |
| 2007/0268133 A1* | 11/2007 | Sanchez | G08B 13/2462 340/568.1 |
| 2008/0223147 A1* | 9/2008 | Deutscher | G01F 1/668 73/861.27 |
| 2009/0271128 A1* | 10/2009 | Umekage | G01F 1/00 702/45 |
| 2013/0201134 A1 | 8/2013 | Schneider et al. | |
| 2014/0292666 A1* | 10/2014 | Shi | G06F 3/0416 345/173 |
| 2014/0354597 A1 | 12/2014 | Kitchens, II et al. | |
| 2015/0068311 A1* | 3/2015 | Tanaka | G01B 17/02 73/629 |
| 2015/0227264 A1 | 8/2015 | Schneider et al. | |
| 2015/0241393 A1 | 8/2015 | Ganti et al. | |
| 2016/0107194 A1* | 4/2016 | Panchawagh | B06B 1/0607 367/140 |
| 2016/0147371 A1* | 5/2016 | Jin | G06F 3/04883 345/173 |
| 2018/0046302 A1 | 2/2018 | Wang et al. | |
| 2018/0101711 A1* | 4/2018 | D'Souza | G06K 9/0002 |

FOREIGN PATENT DOCUMENTS

| | | |
|---|---|---|
| CN | 105247445 A | 1/2016 |
| CN | 105389102 A | 3/2016 |
| CN | 105843446 A | 8/2016 |
| CN | 105868740 A | 8/2016 |
| CN | 105993020 A | 10/2016 |
| CN | 205691915 U | 11/2016 |
| CN | 106227446 A | 12/2016 |
| WO | WO2014018121 A1 | 1/2014 |

* cited by examiner

TOUCH CONTROL DEVICE, ELECTRONIC APPARATUS AND CONTROL METHOD OF ELECTRONIC APPARATUS

This application claims priority to Chinese Patent Application No. 201710648266.0, filed with the State Intellectual Property Office on Aug. 1, 2017 and titled "Input Device and Electronic Apparatus", the entire contents of which are incorporated herein by reference.

TECHNICAL FIELD

The present disclosure relates to a touch control device, an electronic apparatus and a control method of an electronic apparatus.

BACKGROUND

With the development of smart devices, a touch and control (touch control) function has become an indispensable function thereof. At present, the touch control function of the smart devices is mainly used for generating of a key touch instruction and fingerprint recognition, and is usually designed as a touch button or integrated on a touch screen, such that an electrical signal is generated when a user touches the touch button or the touch screen with a finger. Then, a processing module can determine a corresponding key touch instruction or user fingerprint image in accordance with the electrical signal.

However, the above touch solution requires the user to touch the touch button or the touch screen. If the user does not perform a touch operation, the electrical signal cannot be generated. Consequently, the touch control function cannot be realized.

SUMMARY

The embodiments of the present disclosure provide a touch control device, an electronic apparatus and a control method of an electronic apparatus.

The embodiments of the present disclosure provide a touch control device, comprising: a plurality of transceivers disposed in an array and configured to transmit ultrasonic waves and to receive ultrasonic waves that are reflected back, wherein directions in which the plurality of transceivers transmits the ultrasonic waves are parallel to one another; and a processor connected to each of the transceivers and configured to determine a touch control signal in accordance with at least one of a time difference between times at which each of the transceivers transmits and receives the ultrasonic waves and an intensity difference between the transmitted and received ultrasonic waves, and to control touch control device in accordance with the touch control signal, wherein the touch control signal comprises at least one of an operation instruction and user fingerprint information.

In an implementation of the embodiments of the present disclosure, the plurality of transceivers are disposed on a surface of a display screen, a transmitting end of the transceivers faces the display screen, and the surface, on which the transceivers are disposed, is a surface that is opposite to a light-exiting surface of the display screen.

In an implementation of the embodiments of the present disclosure, each of the transceivers comprises an ultrasonic transducer, a transfer component configured to transfer the ultrasonic waves and bonding adhesive, and the transfer component is disposed on the side, which transmits the ultrasonic waves, of the ultrasonic transducer through the bonding adhesive.

In an implementation of the embodiments of the present disclosure, the transfer component is silica-based ceramic of which the bottom is secured to a surface of the ultrasonic transducer, a groove for transferring the ultrasonic waves is formed on the top of the silica-based ceramic, and a depth direction of the groove is the same as a transmitting direction of the ultrasonic waves.

In an implementation of the embodiments of the present disclosure, each transceiver further comprises a key and conductive rubber that is disposed in the groove of the silica-based ceramic, an expansion direction of the conductive rubber is the same as the transmitting direction of the ultrasonic waves, and the key is secured to the end, away from the bottom of the silica-based ceramic, of the conductive rubber.

In an implementation of the embodiments of the present disclosure, each of the transceivers further comprises an insulating layer that is disposed between the silica-based ceramic and the bonding adhesive.

In an implementation of the embodiments of the present disclosure, the processor is configured to acquire an electrical signal of the conductive rubber and to control the ultrasonic transducer to work when the acquired electrical signal of the conductive rubber is changed.

In an implementation of the embodiments of the present disclosure, the conductive rubber is filled with a carbon nano tube.

In an implementation of the embodiments of the present disclosure, the touch control device is configured in the electronic apparatus, wherein the processor is configured to control the plurality of transceivers to work when a preset application in the electronic apparatus is started.

In an implementation of the embodiments of the present disclosure, touch control device further comprises an infrared detection unit configured to detect whether a human body approaches the touch control device through infrared rays, wherein the processor is configured to control the plurality of transceivers to work when the infrared detection unit detects that the human body approaches the touch control device.

The embodiments of the present disclosure further provide an electronic apparatus, comprising a touch control device which comprises a plurality of transceivers disposed in an array and configured to transmit ultrasonic waves and to receive ultrasonic waves that are reflected back, wherein directions in which the plurality of transceivers transmit the ultrasonic waves are parallel to one another; and a processor connected to each of the transceivers and configured to: determine a touch control signal in accordance with at least one of a time difference between times at which each of the transceivers transmits and receives the ultrasonic waves and an intensity difference between the transmitted and received ultrasonic waves, and to control the electronic apparatus in accordance with the touch control signal, wherein the touch control signal comprises at least one of an operation instruction and user fingerprint information.

In an implementation of the embodiments of the present disclosure, the processor is configured to determine a position that corresponds to a first transceiver as a click position when a time difference between times at which the first transceiver in the plurality of transceivers transmits and receives the ultrasonic waves is smaller than or equal to a set time value, and/or when an intensity difference between the transmitted and received ultrasonic waves is smaller than or equal to a set intensity value; and the processor is further configured to generate an operation instruction for indicating a click operation by a user in accordance with the click position if the click positions within a cycle or at least two continuous cycles are the same, and to generate an operation instruction for indicating a slide operation in accordance with a change order of the click position if the click positions within a cycle or at least two continuous cycles are changed.

In an implementation of the embodiments of the present disclosure, the processor is configured to determine a position that is in contact with ultrasonic waves transmitted by a first transceiver as a fingerprint concave portion when a time difference between times at which the first transceiver in the plurality of transceivers transmits and receives the ultrasonic waves is smaller than or equal to a first set time value, and/or when an intensity difference between the transmitted and received ultrasonic waves is smaller than or equal to a first set intensity value; the processor is further configured to determine the position that is in contact with the ultrasonic waves transmitted by the first transceiver as a fingerprint convex portion when the time difference between the time at which the first transceiver in the plurality of transceivers transmits and receives the ultrasonic waves is greater than the first set time value and smaller than or equal to a second set time value, and/or when the intensity difference between the transmitted and received ultrasonic waves is greater than the first set intensity value and smaller than or equal to a second set intensity value, wherein the second set time value is greater than the first set time value, and the second set intensity value is greater than the first set intensity value; and the processor is further configured to generate the user fingerprint information in accordance with the determined fingerprint concave portion and fingerprint convex portion In an implementation of the embodiments of the present disclosure, the processor is configured to determine whether the user fingerprint information is the same as preset fingerprint information through comparison, and to unlock the electronic apparatus when the user fingerprint information and the preset fingerprint information are the same.

In an implementation of the embodiments of the present disclosure, each of the transceivers comprises an ultrasonic transducer, a transfer component configured to transfer ultrasonic waves and bonding adhesive, and the transfer component is disposed on the side, which transmits the ultrasonic waves, of the ultrasonic transducer through the bonding adhesive.

In an implementation of the embodiments of the present disclosure, the transfer component is silica-based ceramic of which the bottom is secured to a surface of the ultrasonic transducer, a groove for transferring the ultrasonic waves is formed in the top of the silica-based ceramic, and a depth direction of the groove is the same as a transmitting direction of the ultrasonic waves.

The embodiments of the present disclosure further provide a control method of electronic apparatus, comprising the steps of: determining at least one of a time difference between times at which each of a plurality of transceivers transmits and receives ultrasonic waves and an intensity difference between the transmitted and received ultrasonic waves; determining a touch control signal in accordance with at least one of the time difference between the time at which each of the transceivers transmits and receives the ultrasonic waves and the intensity difference between the transmitted and received ultrasonic waves, wherein the touch control signal comprises at least one of an operation instruction and user fingerprint information; and controlling the electronic apparatus in accordance with the touch control signal.

In an implementation of the embodiments of the present disclosure, the step of determining the touch control signal in accordance with at least one of the time difference between the time at which each transceiver transmits and receives the ultrasonic waves and the intensity difference between the transmitted and received ultrasonic waves comprises the steps of: determining a position that corresponds to a first transceiver as a click position when a time difference between times at which the first transceiver in the plurality of transceivers transmits and receives ultrasonic waves is smaller than or equal to a set time value, and/or when an intensity difference between the transmitted and received ultrasonic waves is smaller than or equal to a set intensity value; and generating an operation instruction for indicating a click operation by a user in accordance with the click position if the click positions within a cycle or at least two continuous cycles are the same, and generating an operation instruction for indicating a slide operation in accordance with a change order of the click position if the click positions within a cycle or at least two continuous cycles are changed.

In an implementation of the embodiments of the present disclosure, the step of determining the touch control signal in accordance with at least one of the time difference between the time at which each of the transceivers transmits and receives the ultrasonic waves and the intensity difference between the transmitted and received ultrasonic waves comprises the steps of: determining a position that is in contact with ultrasonic waves transmitted by a first transceiver as a fingerprint concave portion when a time difference between times at which the first transceiver in the plurality of transceivers transmits and receives the ultrasonic waves is smaller than or equal to a first set time value, and/or when an intensity difference between the transmitted and received ultrasonic waves is smaller than or equal to a first set intensity value; determining the position that is in contact with the ultrasonic waves transmitted by the first transceiver as a fingerprint convex portion when the time difference between times at which the first transceiver in the plurality of transceivers transmits and receives the ultrasonic waves is greater than the first set time value and smaller than or equal to a second set time value, and/or when an intensity difference between the transmitted and received ultrasonic waves is greater than the first set intensity value and smaller than or equal to a second set intensity value, wherein the second set time value being greater than the first set time value, and the second set intensity value being greater than the first set intensity value; and generating the user fingerprint information in accordance with the determined fingerprint concave portion and fingerprint convex portion.

In an implementation of the embodiments of the present disclosure, the step of controlling the electronic apparatus in accordance with the touch control signal comprises the steps of: determining whether the user fingerprint information is the same as preset fingerprint information through comparison, and unlocking the electronic apparatus when the user fingerprint information and the preset fingerprint information are the same.

According to the embodiments of the present disclosure, a plurality of transceivers are disposed in an array to transmit ultrasonic waves and to receive ultrasonic waves that are reflected back, and the processor is configured to generate least one of an operation instruction and user fingerprint information in accordance with at least one of a time difference between times at which the ultrasonic waves are transmitted and received and an intensity difference between the transmitted and received ultrasonic waves. In this process, the user does not need to perform a touch operation but only to place the finger on the ultrasonic wave transmitting path. Thus, the problem that a touch control function may not be realized until a touch operation is performed is solved.

DETAILED DESCRIPTION

The embodiments of the present disclosure will be described in further detail with reference to the enclosed drawings, to clearly present the principles and advantages of the present disclosure.

Figure 1:
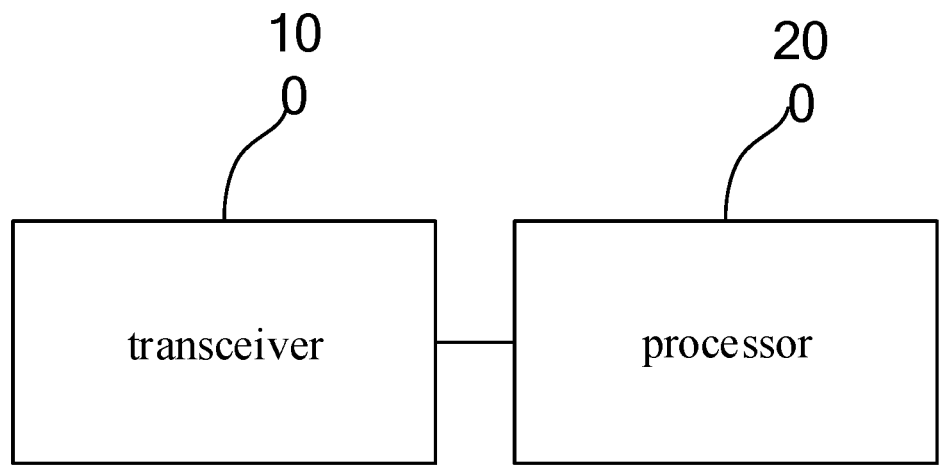
FIG. 1 is a schematic diagram of a structure of a touch control device according to an embodiment of the present disclosure.

FIG. 1 is a schematic diagram of a structure of a touch control device according to an embodiment of the present disclosure. The touch control device includes a processor 200 and a plurality of transceivers 100 disposed in an array. The transceivers 100 are configured to transmit ultrasonic waves and to receive ultrasonic waves that are reflected back, wherein directions in which the plurality of transceivers 100 transmits the ultrasonic waves are parallel to one another. The processor 200 is connected to each of the transceivers 100 and configured to generate a touch control signal in accordance with at least one of a time difference between a time at which each of the transceivers transmits the ultrasonic waves and a time at which each of the transceivers receives the ultrasonic waves and an intensity difference between the transmitted and received ultrasonic waves.

Herein, the touch control signal includes but not limited to at least one of an operation instruction and user fingerprint information, exemplarily, may only include the operation instruction or the user fingerprint information, and may also simultaneously include the operation instruction and the user fingerprint information. That is, the processor 200 determines the touch control signal, comprising at least one of the user fingerprint information and the operation instruction, and then controls touch control device in accordance with the touch control signal. Here, controlling the electronic apparatus may be unlocking the electronic apparatus and may also be controlling an application in the electronic apparatus. For example, the electronic apparatus is unlocked in accordance with the operation instruction and the user fingerprint information, e.g., a screen is waked up in accordance with the operation instruction, and then, unlocking is realized in accordance with the user fingerprint information. For another example, the electronic apparatus or the application is controlled in accordance with the operation instruction, e.g., page turning and the like are performed through the operation instruction. For a third example, the application is controlled in accordance with the user fingerprint information, e.g., payment, login and the like are accomplished through the user fingerprint information first.

According to the present disclosure, the plurality of transceivers are disposed in the array to transmit the ultrasonic waves and then to receive the ultrasonic waves that are reflected back (the ultrasonic waves are returned after meeting an object (e.g., a finger of a user)). The processor may determine whether the ultrasonic waves are returned after meeting the object that is close to the touch control device in accordance with at least one of the time difference between the time at which the ultrasonic waves are transmitted and received and the intensity difference between the transmitted and received ultrasonic waves, and if yes, generates one of the operation instruction and the user fingerprint information. In addition, the touch control device includes the plurality of transceivers 100, which are disposed in the array and transmit the ultrasonic waves in the same direction. The touch control device may locate the finger of the user and output the operation instruction in accordance with an operation by the finger of the user when the finger of the user is on an ultrasonic wave transmitting path of the touch control device. The operation instruction may correspond to different screen keys or virtual keys. Alternatively, the plurality of transceivers 100 may detect fingerprint concave portions and convex portions that correspond to all positions to constitute the user fingerprint information. In this process, the user does not need to perform a touch operation but only to place the finger on the ultrasonic wave transmitting path. Thus, the problem that a touch function may not be realized until a touch operation is performed is solved. For example, in a process of projected display by use of a mobile phone or a computer, the touch control device may be adopted to avoid inconvenience caused by directly operating the mobile phone or the computer. Thus, the mobile phone or the computer is convenient to use.

In an implementation of the embodiments of the present disclosure, the plurality of transceivers 100 are disposed on a surface of a display screen. A transmitting end of transceivers 100 faces the display screen. The surface, on which the transceivers 100 are disposed, of the display screen is a surface that is opposite to a light-exiting surface of the display screen. In this case, the ultrasonic waves transmitted by the transceivers 100 may penetrate the display screen in front, such that gestures or fingerprints of the user are identified. The operation instruction and the user fingerprint information are generated. Thus, the display screen may slightly weaken the ultrasonic waves without influencing identification of the touch operation and the fingerprints of the user in the present disclosure.

In another implementation of the embodiments of the present disclosure, the plurality of transceivers 100 may also be disposed in the electronic apparatus. A transmitting end of transceivers 100 faces away from a display screen. Not only may the transceivers 100 be completely located in the electronic apparatus but also the transmitting ends of the transceivers 100 may be exposed out of a back side of an electronic housing. In this implementation, gestures or fingerprints of the user may be identified through the back side of the electronic apparatus.

In yet another implementation of the embodiments of the present disclosure, the plurality of transceivers 100 may be also disposed in a peripheral area of a display screen. That is, the transceivers 100 are disposed beside a display area of the display screen. In this case, the display screen may not be covered when the user operates the touch control device.

Optionally, the operation instruction may be a touch instruction in touch apparatus and is for indicating a click operation (e.g., single click and double click) of the user. Exemplarily, the processor 200 simultaneously processes a transmitting and receiving time difference and/or an intensity difference of the ultrasonic waves of the plurality of transceivers 100 and determines whether a position that corresponds to each transceiver is a click position. Generally, the click positions of the user include positions that corresponds to a plurality of transceivers. For example, the finger of the user may correspond to a plurality of transceivers. During an operation, the plurality of transceivers may detect the finger of the user. The processor 200 periodically detects the transmitting and receiving time difference and/or the intensity difference of the ultrasonic waves of the plurality of transceivers 100, may generate the operation instruction for indicating the click operation by the user if touch positions of the finger of the user are the same within a cycle or two or a plurality of continuous cycles, and may generate the operation instruction for indicating a slide operation if the touch positions of the finger of the user are changed within a cycle or two or a plurality of continuous cycles. Similarly, the processor 200 may generate the user fingerprint information by the following means. The processor 200 respectively determines whether a position that corresponds to each of the transceivers 100 is a convex portion or a concave portion of the finger in accordance with the transmitting and receiving time difference and/or the intensity difference of the ultrasonic waves of each transceiver 100, and forms the user fingerprint information in accordance with determination results of the plurality of transceivers 100. For example, the convex portion and the concave portion respectively correspond to two difference pixels (e.g. different gray levels), and the pixels that correspond to the plurality of transceivers 100 are arranged in accordance with the positions of the plurality of transceivers 100 to obtain a fingerprint image. That is, the user fingerprint information is generated.

Optionally, the intensity difference between the transmitted and received ultrasonic waves means a difference value between the intensity of the transmitted ultrasonic waves and the intensity of the received ultrasonic waves returned by the transmitted ultrasonic waves.

It is easy to know that in order to facilitate design and signal processing, the processor includes but not limited to a processing chip, an integrated circuit unit, etc.

In the embodiments of the present disclosure, when the user touches or approaches the touch control device, the processor 200 may generate the operation instruction in accordance with detection results of the plurality of transceivers.

Exemplarily, the processor 200 is configured to generate the operation instruction when at least one of the plurality of transceivers 100 meets at least one of a first condition and a second condition. The first condition is that a time difference between the time at which the at least one transceiver transmits the ultrasonic waves and the time at which the at least one transceiver receives the ultrasonic waves is smaller than or equal to a set time value. The second condition is that an intensity difference between the transmitted and received ultrasonic waves by the transceiver is smaller than or equal to a set intensity value. The processor 200 is configured to generate the operation instruction when the time difference between the time at which the at least one of the plurality of transceivers transmits the ultrasonic waves and the time at which the at least one of the plurality of transceivers receives the ultrasonic waves is smaller than or equal to the set time value, and/or when the intensity difference between the transmitted and received ultrasonic waves is smaller than or equal to the set intensity value.

Here, the operation instruction may be for indicating that the click position of the user is the position that corresponds to the at least one transceiver. For example, the processor 200 is configured to generate the operation instruction, indicating that the click position of the user is the position that corresponds to a transceiver, when the transceiver meets at least one of the first condition and the second condition. The processor 200 is configured to generate the operation instruction when the plurality of transceivers meets at least one of the first condition and the second condition. At this time, the plurality of transceivers are disposed adjacent to one another. The operation instruction indicates that the click position of the user is the position that corresponds to the plurality of transceivers, for example, center of the plurality of transceivers.

In the embodiments of the present disclosure, the processor 200 is configured to determine a position that corresponds to a first transceiver as the click position when the time difference between the times at which the first transceiver in the plurality of transceivers transmits and receives the ultrasonic waves is smaller than or equal to a set time value, and/or when an intensity difference between the transmitted and received ultrasonic waves is smaller than or equal to a set intensity value, to generate an operation instruction for indicating a click operation by the user in accordance with the click position if the click positions within a cycle or at least two continuous cycles are the same, and to generate an operation instruction for indicating a slide operation in accordance with a change order of the click position if the click positions within a cycle or at least two continuous cycles are changed.

Besides detecting and generating operation instruction, the touch control device may also acquire the user fingerprint information of the user. That is, the touch control device may not only independently but also simultaneously acquire the operation instruction and the user fingerprint information, which is determined by an application that is currently in a foreground of the electronic apparatus with the touch control device. For example, the user may input information through the touch control device to realize fingerprint unlocking when the electronic apparatus is currently in a dormant state and no application is in the foreground. At this time, the touch control device may simultaneously acquire the user fingerprint information and the operation instruction, wakes up a screen in accordance with the operation instruction, and then realizes unlocking in accordance with the user fingerprint information. For another example, only the operation instruction is required when the application that is currently in the foreground is a piece of news.

Exemplarily, the processor 200 is configured to determine a position that is in contact with the ultrasonic waves transmitted by a first transceiver as a fingerprint concave portion when the first transceiver in the plurality of transceivers 100 meets at least one of a third condition and a fourth condition, to determine a position that is in contact with the ultrasonic waves transmitted by the first transceiver as a fingerprint convex portion when the first transceiver meets at least one of a fifth condition and a sixth condition, and to generate the user fingerprint information in accordance with whether the position which is in contact with the ultrasonic waves transmitted by each of the plurality of transceivers is the fingerprint concave portion or the fingerprint convex portion. The third condition is that a time difference between times at which the first transceiver transmits and receives the ultrasonic waves is smaller than or equal to a first set time value. The fourth condition is that an intensity difference between the transmitted ultrasonic waves and the received ultrasonic waves is smaller than or equal to a first set intensity value. The fifth condition is that a time difference between times at which the first transceiver transmits and receives the ultrasonic waves is greater than the first set time value and smaller than or equal to a second set time value. The sixth condition is that an intensity difference between the transmitted ultrasonic waves and the received ultrasonic waves is greater than the first set intensity value and smaller than or equal to a second set intensity value. The second set time value is greater than the first set time value. The second set intensity value is greater than the first set intensity value. The processor 200 is configured to determine a position that is in contact with the ultrasonic waves transmitted by a first transceiver as a fingerprint concave portion when a time difference between times at which the first transceiver in the plurality of transceivers transmits and receives the ultrasonic waves is smaller than or equal to a first set time value, and/or when an intensity difference between the transmitted ultrasonic waves and the received ultrasonic waves is smaller than or equal to a first set intensity value, to determine a position that is in contact with the ultrasonic waves transmitted by the first transceiver as a fingerprint convex portion when the time difference between times at which the first transceiver in the plurality of transceivers transmits and receives the ultrasonic waves is smaller than or equal to a second set time value, and/or when an intensity difference between the transmitted ultrasonic waves and the received ultrasonic waves is smaller than or equal to a second set intensity value, and to generate the user fingerprint information in accordance with the determined fingerprint concave portion and fingerprint convex portion. The second set time value is greater than the first set time value. The second set intensity value is greater than the first set intensity value.

In the above implementation, the processor 200 determines whether the finger of the user exists in the positions that correspond to the transceivers 100 by determining the time difference and/or the intensity difference of the transmitted ultrasonic waves and the received ultrasonic waves. If the time difference and/or the intensity difference is smaller than the set value, the finger exists on the ultrasonic-wave transmitting path and is closer, which shows that the user is operating the touch control device. At this time, the user operation instruction is generated. In addition, whether the positions that correspond to the transceivers 100 are concave portions or convex portions of the finger of the user by judging more delicate difference of the time difference and/or the intensity difference. The user fingerprint information of the user may be obtained in accordance with judgment results of the plurality of transceivers. A judgment result of the processor corresponds to a pixel on a fingerprint image.

Further, the processor 200 may be configured to unlock the electronic apparatus in accordance with the fingerprint information, to determine whether the user fingerprint information is the same as the preset fingerprint information through comparison, and to unlock the electronic apparatus when the user fingerprint information is the same as the preset fingerprint information. However, the electronic apparatus is not unlocked when the user fingerprint information is different from the preset fingerprint information.

In the embodiments of the present disclosure, the set time value and the set intensity value are relevant to a preset transmission distance when the ultrasonic waves are reflected. The longer the transmission distance is, the larger the corresponding set time value and set intensity value are. The shorter the transmission distance is, the smaller the set time value and the set intensity value are. Thus, the only requirement is to define a set distance value and then to determine the set time value and the set intensity value that correspond to the set distance value. Usually, the set distance value may be set relatively smaller, such that either the operation instruction or the user fingerprint information may not be generated until the finger of the user touches the touch control device or a relatively smaller gap is kept between the finger of the user and the touch control device. Thus, a touch control signal may not be mistakenly generated by most objects which are closer to the touch control device by a distance that is greater than the set distance value. Accordingly, a misoperation may be avoided. Exemplarily, the set distance value is the distance between the transceivers and the fingerprint concave portion of the finger when the finger of the user is placed on a housing of the touch control device.

Likewise, the first set time value, the first set intensity value, the second set time value and the second set intensity value are identically designed. A first set distance value that corresponds to the first set time value and the first set intensity value is the distance between the transceivers and the fingerprint convex portion of the finger when the finger of the user is placed on the housing of the touch control device. A second set distance value that corresponds to the second set time value and the second set intensity value is the distance between the transceivers and the fingerprint concave portion of the finger when the finger of the user is placed on the housing of the touch control device.

Further, in order to guarantee that the operation instruction or the user fingerprint information is not generated until the ultrasonic waves are reflected after meeting the finger of the user, the processor 200 is further configured to generate the operation instruction or the user fingerprint information when the time differences between time at which the ultrasonic waves are transmitted and received by the plurality of transceivers are not completely the same and are within a preset time range, and/or when the intensity differences between the ultrasonic waves that are transmitted and received by the plurality of transceivers are not completely the same and are within a preset intensity range. Because the time differences or the intensity differences of the transmitted ultrasonic waves and the received ultrasonic waves are not completely the same and their difference values are within certain ranges when the ultrasonic waves transmitted by the transceivers are reflected by the fingerprint concave portion and the fingerprint convex portion of the finger, through the above design, it can be guaranteed that the object detected by the ultrasonic waves is the finger of the user but not other objects. Thus, the misoperation is avoided. The preset time range and the preset intensity range are relevant to a depth difference between the fingerprint concave portion and the fingerprint convex portion of the finger.

Figure 2:
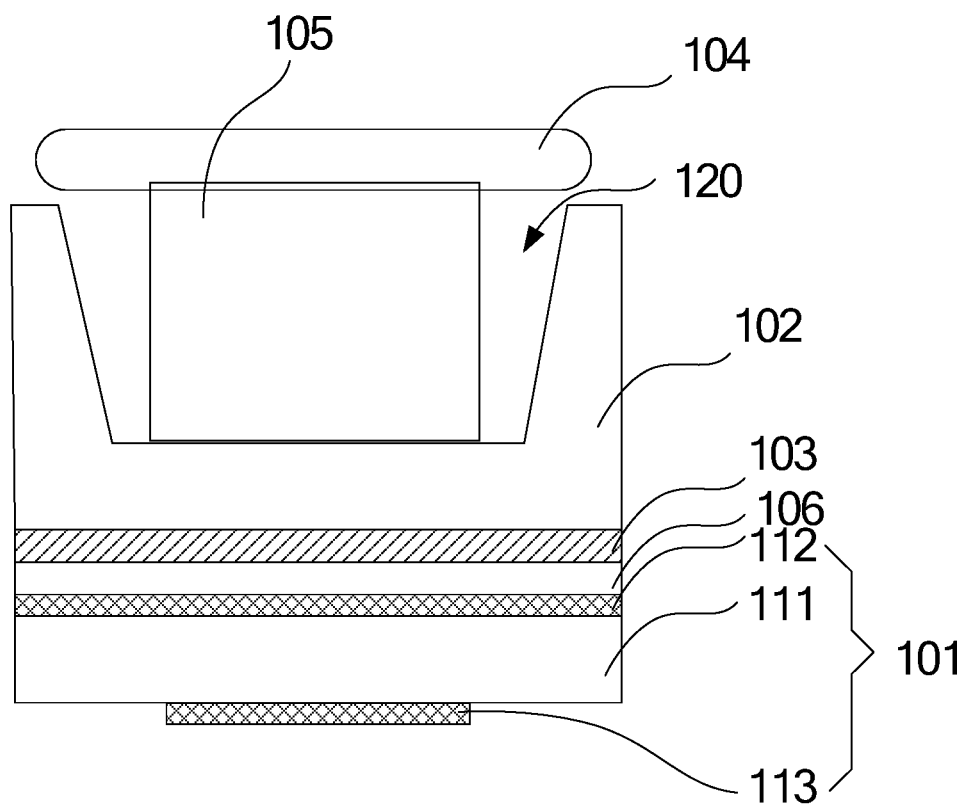
FIG. 2 is a schematic diagram of a structure of a transceiver according to an embodiment of the present disclosure.
Figure 3:
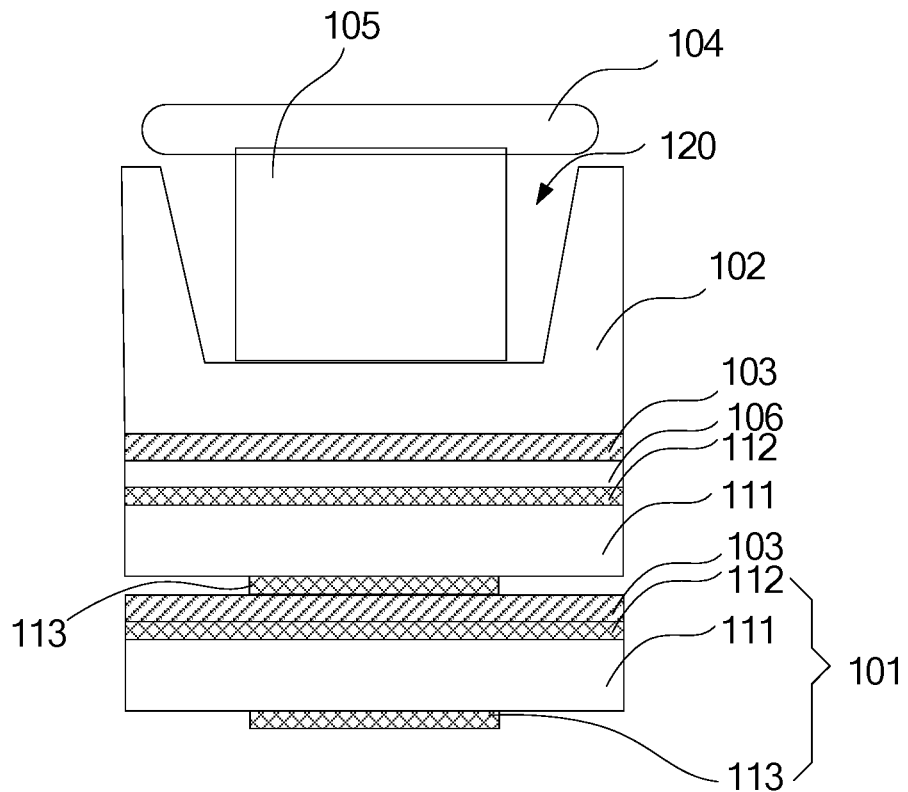
FIG. 3 is a schematic diagram of a structure of another transceiver according to an embodiment of the present disclosure.

FIG. 2 is a structural schematic view of a transceiver 100 provided by an embodiment of the present disclosure. Referring to FIG. 2, the transceiver 100 includes an ultrasonic transducer 101 configured to transmit and receive ultrasonic waves in a time-shared manner. FIG. 3 is a structural schematic view of another transceiver 100 provided by an embodiment of the present disclosure. Referring to FIG. 3, the transceiver 100 includes two ultrasonic transducers 101 that are superposed in a transmitting direction of ultrasonic waves and respectively configured to transmit and receive the ultrasonic waves. There may be one or two ultrasonic transducers 101. When the one ultrasonic transducer 101 is adopted, it transmits and receives the ultrasonic waves in a time-shared manner. When the two ultrasonic transducers 101 are adopted, one may transmit the ultrasonic waves and the other may receive returned ultrasonic waves.

As shown in FIG. 3, when the transceiver 100 includes the two superposed ultrasonic transducers 101, the two ultrasonic transducers 101 may be connected through bonding adhesive 103 that may be realized by an epoxy resin series cementing agent.

In the following, the structure of the two ultrasonic transducers 101 is taken as an example for explanation. The two ultrasonic transducers 101 are respectively a first ultrasonic transducer and a second ultrasonic transducer. The first ultrasonic transducer is configured to transmit the ultrasonic waves. An ultrasonic signal is returned after passing through the finger of the user. The second ultrasonic transducer receives ultrasonic waves that are returned after passing through the finger of the user. The processor 200 computes the time difference between time at which the ultrasonic waves are transmitted and received, and/or computes the intensity difference between the transmitted and received ultrasonic waves in accordance with the intensities of the transmitted and received ultrasonic waves, and then, generates the operation instruction or the user fingerprint information in accordance with the computed time difference between the time at which the ultrasonic waves are transmitted and received and/or the intensity difference between the transmitted and received ultrasonic waves.

The ultrasonic transducer 101 is a device or an apparatus that may convert electric energy into acoustic energy and may also convert acoustic energy into electric energy. The ultrasonic transducer 101 may convert electric energy into mechanical energy and then mechanical energy into acoustic energy to transmit ultrasonic waves in a transmitting state, and may convert acoustic energy into mechanical energy and then mechanical energy into electric energy to receive the ultrasonic waves and to output a signal to the processor 200 in a receiving state.

At present, there are many types of ultrasonic transducers and piezoelectric ultrasonic transducers are used more frequently. A piezoelectric ultrasonic transducer 101 includes a piezoelectric ceramic piece 111, as well as a first electrode 112 and a second electrode 113 that are disposed on two opposite sides of the piezoelectric ceramic piece 111 respectively. The first electrode 112 and the second electrode 113 are configured to drive the piezoelectric ceramic piece and to feed back an electrical signal that is generated by the piezoelectric ceramic piece. The piezoelectric ceramic piece 111 is configured to convert electric energy, mechanical energy and acoustic energy. Exemplarily, in a transmitting state, voltages are loaded on an upper surface and a lower surface of the piezoelectric ceramic piece, the piezoelectric ceramic piece expands and moves lengthwise under the action of an electric field. Due to elastic binding, the piezoelectric ceramic piece seems to be a small piston during a vibration, and has a very small amplitude of about 1 to 10 μm. However, this vibration has a very high acceleration of about 10 to 1000 g (g denotes a gravitational acceleration). In this way, electric energy may be converted into mechanical vibration quantity. If this kind of energy is transmitted in a certain direction, ultrasonic waves are formed. Thus, the whole structure vibrates, transmits the ultrasonic waves and converts the loaded electric energy into mechanical energy and then mechanical energy into acoustic energy. In a receiving state, an ultrasonic signal (an echo signal) with a certain sound pressure is received and sent to the piezoelectric ceramic piece by a medium to arouse an inductive charge. The intensity of the sound pressure may be judged by detecting the charge. Thus, acoustic energy is converted into mechanical energy and then electric energy.

The piezoelectric ceramic piece is made of a monocrystalline material or a polycrystalline material, such as quartz crystals, barium titanate piezoelectric ceramics, Pb-based lanthanumdoped zirconate titanates piezoelectric ceramic compound crystals (PZT) and polyvinylidene fluoride (PVDF).

Referring to FIG. 2 and FIG. 3, the transceiver 100 may further include a transfer component 102 configured to transfer ultrasonic waves and bonding adhesive 103. The transfer component 102 is disposed on the side, which transmits the ultrasonic waves, of the ultrasonic transducer 101 through the bonding adhesive 103. The transfer component 102 is disposed to guarantee the transmission direction of the ultrasonic waves.

Exemplarily, if the transceiver 100 include one ultrasonic transducer 101, the transfer component 102 is located on the ultrasonic transducer 101. If the transceiver 100 include two ultrasonic transducers 101, the transfer component 102 is located on the later ultrasonic transducer 101, disposed on the ultrasonic wave transmitting path, of the transceiver 100. As shown in FIG. 3, the two ultrasonic transducers 101 are superposed. The transmitting direction of the ultrasonic waves is from bottom to top (the direction in FIG. 3). The transfer component 102 is disposed on the ultrasonic transducer 101 above.

Exemplarily, the transfer component 102 may be silica-based ceramic. Referring to FIG. 2 and FIG. 3, the bottom of the silica-based ceramic is secured to a surface of the ultrasonic transducer 101. A groove 120 for transferring the ultrasonic waves is formed in the top of the silica-based ceramic. A depth direction of the groove 120 is the same as the transmitting direction of the ultrasonic waves. The transfer component 102 is realized by the silica-based ceramic which may limit the transmission direction of the ultrasonic waves, such that normal transmission of the ultrasonic waves is guaranteed.

Referring to FIG. 2 and FIG. 3, the transceiver 100 may further include a key 104 and conductive rubber 105 that is disposed in the groove 120 of the silica-based ceramic. An expansion direction of the conductive rubber 105 is the same as the transmitting direction of the ultrasonic waves, that is, is the same as the depth direction of the groove. The key 104 is secured to the end, away from the bottom of the silica-based ceramic, of the conductive rubber 105. Referring to FIG. 2 and FIG. 3, the key 104 is disposed outside the groove 120. When the user presses the key 104, the key 104 presses the conductive rubber 105 to be deformed, which leads to a volumetric change. The volumetric change of the conductive rubber 105 results in a change in capacitance. The touch control device achieves a control function by detecting a change of an electrical signal, aroused by the capacitance of the conductive rubber 105. As the structure of the conductive rubber 105 is similar to that of a spring, the conductive rubber 105 will regain its original shape when the user releases the finger. In addition, as the key 105 and the conductive rubber 105 are disposed, the user may touch and press just like use of a traditional touch structure.

Optionally, the conductive rubber 105 may be made of a composite that is formed by filling rubber with various conductive fillers to make it conductive. For example, the conductive rubber is filled with a carbon nano tube to guarantee its conductivity and its elasticity. Certainly, besides this, the conductive rubber 105 may also adopt carbon black, graphite, carbon fibers, gold, silver, nickel and the like as the conductive fillers.

In order to improve the user experience, the key may be an elastic key, for example, a rubber key, etc.

Optionally, the transceiver 100 may further include an insulating layer 106 that is disposed between the silica-based ceramic and the bonding adhesive 103. As the insulating layer 106 is disposed between the silica-based ceramic and the bonding adhesive 103, the conductive rubber 105 and the ultrasonic transducer 101 are insulated and prevented from mutual signal interference. Meanwhile, the insulating layer 106 may support the silica-based ceramic.

Exemplarily, the insulating layer 106 is made of silicon oxide ceramic.

In the embodiments of the present disclosure, the processor 200 is configured to acquire the electrical signal of the conductive rubber and to control the ultrasonic transducer 101 to work when the acquired electrical signal of the conductive rubber is changed. In this implementation, the capacitance of the conductive rubber will be changed to further result in a change of the electrical signal thereof when the user presses the conductive rubber 105. This is taken as a working trigger signal of the whole transceiver to prevent the ultrasonic transducer 101 (high in electricity consumption) from working all the time so as to avoid waste of electric energy.

In the embodiments of the present disclosure, the touch control device is configured in the electronic apparatus. The processor 200 is configured to control at least one transceiver to work when a preset application in the electronic apparatus is started. For example, the processor 200 controls the plurality of transceivers to work when a screen locking application of the electronic apparatus is started to realize fingerprint unlocking by the user. This implementation takes stating of the preset application as the working trigger signal of the transceiver to prevent the ultrasonic transducer 101 (high in electricity consumption) from working all the time so as to avoid waste of electric energy. That is, the ultrasonic transducer of the transceiver may not start to transmit and receive ultrasonic waves until the preset application is started. Moreover, the operation instruction and/or the user fingerprint information that is generated by the touch control device in the follow-up process may be applied to the preset application to enable the preset application to execute the operation instruction or to enable the preset application to use the user fingerprint information.

Exemplarily, the processor 200 may acquire startup status of the application of the electronic apparatus in which the touch control device is disposed so as to control working of the transceiver. To facilitate design and production, the processor 200 may be a processing chip in the electronic apparatus.

For example, the preset application may be set by a mobile phone manufacturer by default or self-set by the user, which may be such system applications as fingerprint unlocking or a third-party application self-installed by the user, In order to make the touch control device work more intelligently, the preset application may be chosen by the user. There may be one or more preset applications. The processor 200 monitors startup of these applications and controls the transceiver 100 to start to work when monitoring that a certain preset application is started.

In the embodiments of the present disclosure, the touch control device further includes an infrared detection unit configured to detect whether a human body approaches the touch control device through infrared rays. The processor is configured to control the plurality of transceivers to work when the infrared detection unit detects that the human body approaches the touch control device. In this implementation, detection of the human body by the infrared rays is taken as the working trigger signal of the transceiver to prevent the ultrasonic transducer 101 (high in electricity consumption) from working all the time so as to avoid waste of electric energy. Meanwhile, signals generated by mistaken touch of other objects outside the human body are avoided. The infrared detection unit may realize approaching detection of the human body by virtue of the feature that the object of which the temperature is higher than a certain temperature may radiate infrared rays.

There are three ways to generate the working trigger signal of the transceiver. The first is that the user presses the conductive rubber to generate the trigger signal. The second is that the trigger signal is generated during starting of the preset application. The third is that the trigger signal is generated when the human body is detected by the infrared rays. The touch control device may employ any one, or any two or all of the three signal generation modes, which will not be limited by the present disclosure. Two or all of the three signal generation modes work independently when employed. For example, the user may press the conductive rubber or start the preset application to generate the trigger signal.

The infrared detection unit 200 is disposed beside the tough device. The direction of infrared rays output by the infrared detection unit is the same as that of the ultrasonic waves output by the touch control device.

The embodiments of the present disclosure further provide an electronic apparatus, comprising the touch control device described above.

The electronic apparatus provided by the embodiments of the present disclosure may be a mobile phone, tablet computer, a TV, a display, a laptop computer, a digital photo frame, a navigator or any other product or part with a display function.

According to the present disclosure, a plurality of transceivers are disposed in an array to transmit ultrasonic waves and to receive ultrasonic waves that are reflected back, and the processor is configured to generate at least one of an operation instruction and user fingerprint information in accordance with at least one of a time difference between times at which the ultrasonic waves are transmitted and received and an intensity difference between the transmitted and received ultrasonic waves. In this process, the user does not need to perform a touch operation but only to place the finger on the ultrasonic wave transmitting path. Thus, the problem that a touch function may not be realized until a touch operation is performed is solved.

Figure 4:
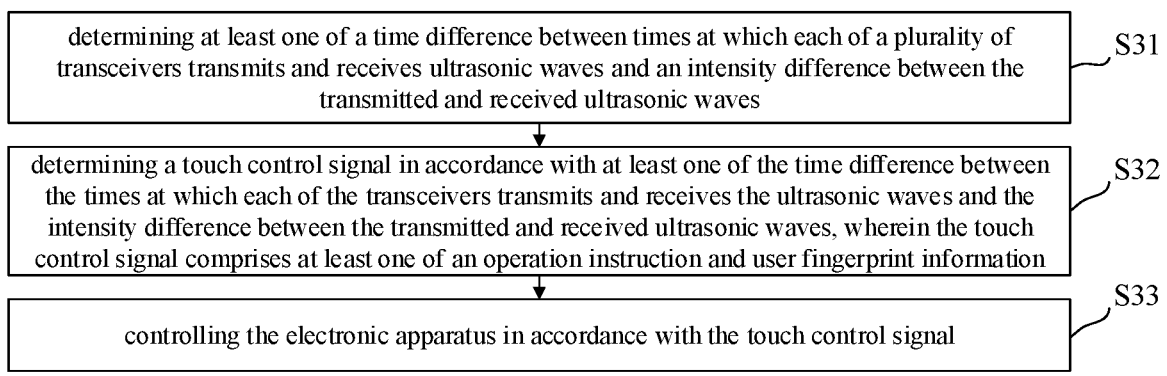
FIG. 4 is a flowchart of a control method of an electronic apparatus according to an embodiment of the present disclosure.

Referring to FIG. 4, the embodiments of the present disclosure further provide a control method of electronic apparatus. The method includes the following steps.

In step S31, at least one of a time difference between times at which each transceiver transmits and receives ultrasonic waves and an intensity difference between the transmitted and received ultrasonic waves is determined.

In step S32, a touch control signal is determined in accordance with at least one of the time difference between the time at which each transceiver transmits and receives the ultrasonic waves and the intensity difference between the transmitted and received ultrasonic waves, wherein the touch control signal comprises at least one of an operation instruction and user fingerprint information.

Further, step S32 may include the steps of: determining a position that corresponds to a first transceiver as a click position when a time difference between times at which the first transceiver in the plurality of transceivers transmits and receives ultrasonic waves is smaller than or equal to a set time value, and/or when an intensity difference between the transmitted and received ultrasonic waves is smaller than or equal to a set intensity value; and generating an operation instruction for indicating a click operation by a user in accordance with the click position if the click positions within a cycle or at least two continuous cycles are the same, and generating an operation instruction for indicating a slide operation in accordance with a change order of the click position if the click positions within a cycle or at least two continuous cycles are changed.

Further, step S32 may further include the steps of: determining a position that is in contact with ultrasonic waves transmitted by a first transceiver as a fingerprint concave portion when a time difference between times at which the first transceiver in the plurality of transceivers transmits and receives the ultrasonic waves is smaller than or equal to a first set time value, and/or when an intensity difference between the transmitted and received ultrasonic waves is smaller than or equal to a first set intensity value; determining the position that is in contact with the ultrasonic waves transmitted by the first transceiver as a fingerprint convex portion when the time difference between times at which the first transceiver in the plurality of transceivers transmits and receives the ultrasonic waves is greater than the first set time value and smaller than or equal to a second set time value, and/or when an intensity difference between the transmitted and received ultrasonic waves is greater than the first set intensity value and smaller than or equal to a second set intensity value, wherein the second set time value being greater than the first set time value, and the second set intensity value being greater than the first set intensity value; and generating the user fingerprint information in accordance with the determined fingerprint concave portion and fingerprint convex portion.

In step S33, the electronic apparatus is controlled in accordance with the touch control signal.

Further, step S33 may include the steps of: determining whether the user fingerprint information is the same as preset fingerprint information through comparison, and unlocking the electronic apparatus when the user fingerprint information and the preset fingerprint information are the same.

The foregoing descriptions are only exemplary embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A touch control device, comprising:
a plurality of transceivers disposed in an array and configured to transmit ultrasonic waves and to receive ultrasonic waves that are reflected back, wherein directions in which the plurality of transceivers transmit the ultrasonic waves are parallel to one another; and
a processor connected to each of the transceivers and configured to determine a touch control signal in accordance with at least one of a time difference between a time at which each of the transceivers transmits the ultrasonic waves and a time at which each of the transceivers receives the ultrasonic waves and an intensity difference between the transmitted and received ultrasonic waves, and to control touch control device in accordance with the touch control signal, wherein the touch control signal comprises at least one of an operation instruction and user fingerprint information,
wherein each of the transceivers comprises an ultrasonic transducer, a transfer component configured to transfer the ultrasonic waves, and bonding adhesive, and the transfer component is disposed on the side, which transmits the ultrasonic waves, of the ultrasonic transducer through the bonding adhesive,
wherein the transfer component is silica-based ceramic of which the bottom is secured to a surface of the ultrasonic transducer, a groove for transferring the ultrasonic waves is formed on the top of the silica-based ceramic, and a depth direction of the groove is the same as a transmitting direction of the ultrasonic waves, and
wherein each of the transceivers further comprises a key and conductive rubber that is disposed in the groove of the silica-based ceramic, an expansion direction of the conductive rubber is the same as the transmitting direction of the ultrasonic waves, and the key is secured to the end, away from the bottom of the silica-based ceramic, of the conductive rubber.

2. The touch control device according to claim 1, wherein the plurality of transceivers are disposed on a surface of a display screen, a transmitting end of the transceivers faces the display screen, and the surface, on which the transceivers are disposed, is a surface that is opposite to a light-exiting surface of the display screen.

3. The touch control device according to claim 1, wherein each of the transceivers further comprises an insulating layer that is disposed between the silica-based ceramic and the bonding adhesive.

4. The touch control device according to claim 1, wherein the processor is configured to acquire an electrical signal of the conductive rubber and to control the ultrasonic transducer to work when the acquired electrical signal of the conductive rubber is changed.

5. The touch control device according to claim 1, wherein the conductive rubber is filled with a carbon nano tube.

6. The touch control device according to claim 1, configured in the electronic apparatus, wherein the processor is configured to control the plurality of transceivers to work when a preset application in the electronic apparatus is started.

7. The touch control device according to claim 1, further comprising an infrared detection unit configured to detect whether a human body approaches the touch control device through infrared rays, wherein the processor is configured to control the plurality of transceivers to work when the infrared detection unit detects that the human body approaches the touch control device.

8. An electronic apparatus, comprising a touch control device which comprises:
a plurality of transceivers disposed in an array and configured to transmit ultrasonic waves and to receive ultrasonic waves that are reflected back, wherein directions in which the plurality of transceivers transmit the ultrasonic waves are parallel to one another; and
a processor connected to each of the transceivers and configured to determine a touch control signal in accordance with at least one of a time difference between a time at which each of the transceivers transmits the ultrasonic waves and a time at which each of the transceivers receives the ultrasonic waves and an intensity difference between the transmitted and received ultrasonic waves, and to control the electronic apparatus in accordance with the touch control signal, wherein the touch control signal comprises at least one of an operation instruction and user fingerprint information, wherein each of the transceivers comprises an ultrasonic transducer, a transfer component configured to transfer the ultrasonic waves, and bonding adhesive, and the transfer component is disposed on the side, which transmits the ultrasonic waves, of the ultrasonic transducer through the bonding adhesive, wherein the transfer component is silica-based ceramic of which the bottom is secured to a surface of the ultrasonic transducer, a groove for transferring the ultrasonic waves is formed on the top of the silica-based ceramic, and a depth direction of the groove is the same as a transmitting direction of the ultrasonic waves, and wherein each of the transceivers further comprises a key and conductive rubber that is disposed in the groove of the silica-based ceramic, an expansion direction of the conductive rubber is the same as the transmitting direction of the ultrasonic waves, and the key is secured to the end, away from the bottom of the silica-based ceramic, of the conductive rubber.

9. The electronic apparatus according to claim 8, wherein the processor is configured to determine a position that corresponds to a first transceiver as a click position when a time difference between a time at which the first transceiver in the plurality of transceivers transmits the ultrasonic waves and a time at which the first transceiver in the plurality of transceivers receives the ultrasonic waves is smaller than or equal to a set time value, and/or when an intensity difference between the transmitted and received ultrasonic waves is smaller than or equal to a set intensity value; and the processor is further configured to generate an operation instruction for indicating a click operation by a user in accordance with the click position if the click positions within a cycle or at least two continuous cycles are the same, and to generate an operation instruction for indicating a slide operation in accordance with a change order of the click position if the click positions within a cycle or at least two continuous cycles are changed.

10. The electronic apparatus according to claim 8, wherein the processor is configured to determine a position that is in contact with ultrasonic waves transmitted by a first transceiver as a fingerprint concave portion when a time difference between a time at which the first transceiver in the plurality of transceivers transmits the ultrasonic waves and a time at which the first transceiver in the plurality of transceivers receives the ultrasonic waves is smaller than or equal to a first set time value, and/or when an intensity difference between the transmitted and received ultrasonic waves is smaller than or equal to a first set intensity value; the processor is further configured to determine the position that is in contact with the ultrasonic waves transmitted by the first transceiver as a fingerprint convex portion when the time difference between the time at which the first transceiver in the plurality of transceivers transmits and receives the ultrasonic waves is greater than the first set time value and smaller than or equal to a second set time value, and/or when the intensity difference between the transmitted and received ultrasonic waves is greater than the first set intensity value and smaller than or equal to a second set intensity value, wherein the second set time value is greater than the first set time value, and the second set intensity value is greater than the first set intensity value; and the processor is further configured to generate the user fingerprint information in accordance with the determined fingerprint concave portion and fingerprint convex portion.

11. The electronic apparatus according to claim 10, wherein the processor is configured to determine whether the user fingerprint information is the same as preset fingerprint information through comparison, and to unlock the electronic apparatus when the user fingerprint information and the preset fingerprint information are the same.

12. A control method of electronic apparatus of claim 8, comprising the steps of:
determining at least one of a time difference between times at which each of a plurality of transceivers transmits and receives ultrasonic waves and an intensity difference between the transmitted and received ultrasonic waves;
determining a touch control signal in accordance with at least one of the time difference between the times at which each of the transceivers transmits and receives the ultrasonic waves and the intensity difference between the transmitted and received ultrasonic waves, wherein the touch control signal comprises at least one of an operation instruction and user fingerprint information; and
controlling the electronic apparatus in accordance with the touch control signal.

13. The control method according to claim 12, wherein the step of determining the touch control signal in accordance with at least one of the time difference between the times at which each of the transceivers transmits and receives the ultrasonic waves and the intensity difference between the transmitted and received ultrasonic waves comprises the steps of:
determining a position that corresponds to a first transceiver as a click position when a time difference between the times at which the first transceiver in the plurality of transceivers transmits and receives ultrasonic waves is smaller than or equal to a set time value, and/or when an intensity difference between the transmitted and received ultrasonic waves is smaller than or equal to a set intensity value; and
generating an operation instruction for indicating a click operation by a user in accordance with the click position if the click positions within a cycle or at least two continuous cycles are the same, and generating an operation instruction for indicating a slide operation in accordance with a change order of the click position if the click positions within a cycle or at least two continuous cycles are changed.

14. The control method according to claim 12, wherein the step of determining the touch control signal in accordance with at least one of the time difference between the times at which each of the transceivers transmits and receives the ultrasonic waves and the intensity difference between the transmitted and received ultrasonic waves comprises the steps of:
determining a position that is in contact with ultrasonic waves transmitted by a first transceiver as a fingerprint concave portion when a time difference between the times at which the first transceiver in the plurality of transceivers transmits and receives the ultrasonic waves is smaller than or equal to a first set time value, and/or when an intensity difference between the transmitted and received ultrasonic waves is smaller than or equal to a first set intensity value; determining the position that is in contact with the ultrasonic waves transmitted by the first transceiver as a fingerprint convex portion when the time difference between times at which the first transceiver in the plurality of transceivers transmits and receives the ultrasonic waves is greater than the first set time value and smaller than or equal to a second set time value, and/or when an intensity difference between the transmitted and received ultrasonic waves is greater than the first set intensity value and smaller than or equal to a second set intensity value, wherein the second set time value being greater than the first set time value, and the second set intensity value being greater than the first set intensity value; and generating the user fingerprint information in accordance with the determined fingerprint concave portion and fingerprint convex portion.

15. The control method according to claim 12, wherein the step of controlling the electronic apparatus in accordance with the touch control signal comprises the steps of:

determining whether the user fingerprint information is the same as preset fingerprint information through comparison, and unlocking the electronic apparatus when the user fingerprint information and the preset fingerprint information are the same.

16. The electronic apparatus according to claim 8, wherein each of the transceivers further comprises an insulating layer that is disposed between the silica-based ceramic and the bonding adhesive.

17. The electronic apparatus according to claim 8, wherein the processor is configured to acquire an electrical signal of the conductive rubber and to control the ultrasonic transducer to work when the acquired electrical signal of the conductive rubber is changed.

18. The electronic apparatus according to claim 8, wherein the conductive rubber is filled with a carbon nano tube.

19. The electronic apparatus according to claim 8, wherein the processor is configured to control the plurality of transceivers to work when a preset application in the electronic apparatus is started.

20. The electronic apparatus according to claim 8, wherein the touch control device further comprises an infrared detection unit configured to detect whether a human body approaches the touch control device through infrared rays, wherein the processor is configured to control the plurality of transceivers to work when the infrared detection unit detects that the human body approaches the touch control device.

* * * * *